United States Patent
Bury et al.

(10) Patent No.: US 12,415,757 B2
(45) Date of Patent: Sep. 16, 2025

(54) METHOD OF MAKING A SPRAYABLE SETTING TYPE COMPOUND

(71) Applicant: KNAUF GIPS KG, Iphofen (DE)

(72) Inventors: Rafael Bury, Wheeling, IL (US);
Joseph W. Schlude, Deerfield, IL (US);
David D. Pelot, Chicago, IL (US);
Naveen Punati, Kildeer, IL (US); Tyler Kincaid, Wheaton, IL (US); Juan Ignacio Huitzil, Puebla (MX)

(73) Assignee: KNAUF GIPS KG, Iphofen (DE)

( * ) Notice: Subject to any disclaimer, the term of this patent is extended or adjusted under 35 U.S.C. 154(b) by 114 days.

(21) Appl. No.: 18/296,552

(22) Filed: Apr. 6, 2023

(65) Prior Publication Data
US 2024/0101479 A1    Mar. 28, 2024

Related U.S. Application Data

(60) Provisional application No. 63/377,497, filed on Sep. 28, 2022.

(51) Int. Cl.
*C04B 28/14* (2006.01)
*C04B 14/10* (2006.01)
(Continued)

(52) U.S. Cl.
CPC .............. *C04B 28/14* (2013.01); *C04B 14/10* (2013.01); *C04B 22/10* (2013.01); *C04B 22/142* (2013.01); *C04B 22/16* (2013.01); *C04B 41/009* (2013.01); *C04B 41/4543* (2013.01); *C04B 41/5085* (2013.01); *C04B 41/65* (2013.01);
(Continued)

(58) Field of Classification Search
CPC .. C04B 28/14; C04B 41/4543; C04B 2103/12
See application file for complete search history.

(56) References Cited

U.S. PATENT DOCUMENTS

| | | | |
|---|---|---|---|
| 3,635,444 A | * | 1/1972 | Potter ............... B01F 25/43141 366/339 |
| 4,454,267 A | | 6/1984 | Williams |

(Continued)

FOREIGN PATENT DOCUMENTS

| | | |
|---|---|---|
| CA | 2333340 A1 | 8/2001 |
| EP | 1403227 A1 | 3/2004 |

(Continued)

OTHER PUBLICATIONS

International Search Report and Written Opinion of the International Searching Authority mailed Feb. 14, 2024 to United States Gypsum Company for International Application No. PCT/US2023/074883 filed Sep. 22, 2023.

*Primary Examiner* — Robert A Vetere
(74) *Attorney, Agent, or Firm* — Vorys, Sater, Seymour and Pease LLP; Pradip Sahu; Philip T. Petti

(57) ABSTRACT

A method of making a setting type compound by injecting an activator compound into a plaster compound wherein the activator compound tube is coaxial and within the plaster compound tube, each at the same flowrate, the same pressure and the same viscosity. The cross sectional transverse areas of an annulus containing the plaster compound and the hole in the annulus containing the activator compound are the same.

17 Claims, 5 Drawing Sheets
(2 of 5 Drawing Sheet(s) Filed in Color)

(51) Int. Cl.
*C04B 22/10* (2006.01)
*C04B 22/14* (2006.01)
*C04B 22/16* (2006.01)
*C04B 41/00* (2006.01)
*C04B 41/45* (2006.01)
*C04B 41/50* (2006.01)
*C04B 41/65* (2006.01)
*C04B 103/12* (2006.01)
*C04B 103/22* (2006.01)
*C04B 103/44* (2006.01)
*C04B 111/00* (2006.01)

(52) U.S. Cl.
CPC ...... *C04B 2103/12* (2013.01); *C04B 2103/22* (2013.01); *C04B 2103/44* (2013.01); *C04B 2111/00172* (2013.01); *C04B 2111/00681* (2013.01)

(56) References Cited

U.S. PATENT DOCUMENTS

| | | | |
|---|---|---|---|
| 4,525,388 A | 6/1985 | Rehder et al. | |
| 4,661,161 A | 4/1987 | Jakacki et al. | |
| 4,934,596 A | 6/1990 | Hilton et al. | |
| 5,746,822 A | 5/1998 | Espinoza et al. | |
| 5,779,786 A | 7/1998 | Patel | |
| 6,228,163 B1 | 5/2001 | Espinoza et al. | |
| 6,355,099 B1 | 3/2002 | Immordino et al. | |
| 6,379,458 B1 | 4/2002 | Immordino et al. | |
| 6,406,537 B1 | 6/2002 | Immordino | |
| 6,545,066 B1 | 4/2003 | Immordino, Jr. et al. | |
| 6,716,906 B1 | 4/2004 | Houman et al. | |
| 6,805,741 B1 | 10/2004 | Liu et al. | |
| 7,588,634 B2 | 9/2009 | Lynn et al. | |
| 7,695,561 B2 | 4/2010 | Cox et al. | |
| 7,754,006 B2 | 7/2010 | Liu et al. | |
| 7,759,416 B2 | 7/2010 | Liling | |
| 10,669,215 B2 | 6/2020 | Stevens et al. | |
| 2004/0187741 A1 | 9/2004 | Liu et al. | |
| 2006/0042519 A1* | 3/2006 | Bowe | C04B 28/14 106/772 |
| 2008/0000918 A1 | 1/2008 | Bruno et al. | |
| 2008/0148996 A1 | 6/2008 | Cox et al. | |
| 2008/0229981 A1* | 9/2008 | Liu | C04B 11/032 106/778 |
| 2009/0208392 A1 | 8/2009 | Klus | |
| 2013/0041311 A1* | 2/2013 | Kohane | A61K 9/0009 424/490 |
| 2017/0233293 A1 | 8/2017 | Ayambem | |
| 2019/0135697 A1 | 5/2019 | Rosenthal et al. | |
| 2019/0276364 A1* | 9/2019 | Sautreuil | C04B 28/06 |
| 2022/0267214 A1 | 8/2022 | Kincaid et al. | |

FOREIGN PATENT DOCUMENTS

| | | |
|---|---|---|
| EP | 3431172 A1 | 1/2019 |
| WO | 2008130310 A1 | 10/2008 |
| WO | 2011096925 A1 | 8/2011 |
| WO | 2014108434 A1 | 7/2014 |
| WO | 2022175865 A1 | 8/2022 |

* cited by examiner

METHOD OF MAKING A SPRAYABLE SETTING TYPE COMPOUND

FIELD OF THE INVENTION

This invention applies to a process or method of making a sprayable setting compound which is a sprayable plaster compound and an activator compound. The sprayable setting-type compound is sprayable onto a substrate to provide a smooth level 4 or 5 quality finish, according to the Gypsum™ Association's GA-214 method. The invention particularly relates to the method in which the sprayable setting-type compound is pumped, combined and sprayed onto a substrate

BACKGROUND OF THE INVENTION

In the construction of buildings, one of the most common building elements is gypsum wallboard, often known as drywall or gypsum paneling, used in the construction of walls and/or ceilings. The board may be composed of any of a variety of materials, including but not limited to, cementitious materials such as, for example, cement or gypsum. Walls made from gypsum wallboard are traditionally constructed by affixing the panels to wood studs or metal framing, and treating the joints between adjoining panels with a specially prepared adhesive called a joint compound. Gypsum panels easily accommodate walls that are unusual in size and can be shaped around structural elements such as beams or pipes. The side edges of the drywall panels are tapered, thus allowing the joint compound to be applied to the seam, between adjoining panels, in such a way that a monolithic surface is created when finished. It is well known in the art that finishing a joint between boards involves three steps. First, a thin layer of joint compound is applied to the boards over the joint, and a permeable paper or fiberglass tape is embedded into it. Next, a second coat of joint compound is applied over the embedded joint tape. The second coat of joint compound typically extends approximately two inches beyond the edges of the joint tape. Finally, a third coat of joint compound is applied over the first two coats, where the third coat typically extends even further out from the edges of the joint tape. Both the second and third coat may be subsequently lightly sanded upon drying. Joint compounds are also used to make repairs of defects, such as uneven surfaces, holes, depressions, gaps, dents, and other imperfections including those around electrical boxes, piping and duct work, as well as corners created by the intersection of drywall boards. Joint compounds are also spray applied and/or hand applied over drywall, concrete, brick and mortar, textured substrates and other conventional substrates.

A variety of joint compounds have been sold commercially, as well as described in printed publications and patents. Generally, such compound compositions are referred to as either "drying-type" joint compounds or "setting-type" joint compounds and are made up of a filler (e.g., calcium carbonate, calcium sulfate hemihydrate, or calcium sulfate dihydrate), thickener, preservative, and a binder, as well as various other additives.

The benefit of a setting type joint compound over a drying type is an independence from having to wait for the joint compound to be completely dry prior to further finishing, as well as less shrinkage and cracking, and a higher overall strength of the finished joint. The rehydration of calcium sulfate hemihydrate normally takes place over a fairly short period of time. Therefore, setting-type compound compositions are typically supplied to the job site in the form of a dry powder to which the user then adds a sufficient amount of water to give the compound a suitable consistency to be applied to the wall.

In the prior art, combining an activator compound and a plaster compound has been difficult because there may be pressure build up or uneven flowrates which may lead to pulsations within the tubes.

A setting-type joint compound provided as an activator compound and plaster compound is combined in a manifold before a static mixer and then is sprayed or applied directly onto the drywall, concrete, brick and mortar, textured substrates and other conventional substrates would be easier to use.

SUMMARY OF THE INVENTION

In the present invention, the activator compound is present in the activator compound tube. The plaster compound is present in the plaster compound tube. The activator compound tube at the manifold becomes co-axial with the plaster compound tube and is within the plaster compound tube. The activator compound is injected into the plaster compound and they mix to form activated setting type joint compound. At the injection point, the inner cross sectional traverse area of the activator compound tube is equal to or less than the cross-sectional transverse area of an annulus between the plaster compound containing tube and the activator compound containing tube. The ratio of the inner cross sectional traverse area of the activator compound tube to the cross-sectional transverse area of an annulus between the plaster compound containing tube and the activator compound containing tube is 0.25:1 to 1:1.

The plaster compound and the activator compound are pumped at the same pressure and the same flowrate.

After the injection point, the plaster compound is in the annulus and the activator compound is in the hole within the annulus. After the injection, the plaster compound and the activator compound are mixed within a static mixer. The injection point is typically at about 80% of the length between the manifold and the static mixer. This avoids the typical adverse effects seen in the prior art such as pulsation due to pressure buildup or unbalanced flowrates between the two fluids caused by density or rheological differences.

At the static mixer, the plaster compound and the activator compound are mixed to yield the setting type joint compound. The setting type joint compound may then be sprayed, foamed or otherwise applied to the drywall, concrete, brick and mortar, textured substrates and other conventional substrates.

The invention includes providing a method of making a setting type compound comprising:
  pumping a plaster compound at a specified first pressure and a specified first flowrate through a first tube,
  injecting an activator compound at a specified second pressure and specified second flowrate through a second tube, the activator compound discharging from an exit at a downstream portion of the second tube located within and coaxial with the first tube to contact the plaster compound;
  wherein an annulus between the first tube and second tube at the exit has a first transverse cross-sectional area,
  wherein the second tube at the exit defines an inner second transverse cross sectional area,
  wherein the first cross-sectional area is equal to or greater than the second cross-sectional area, and mixing the plaster compound with the activator compound in about a 1:1 to 10:1 volume ratio in a static mixer to yield the setting type joint compound.

Preferably the setting type joint compound has about 55 to about 88 wt % solids, more preferably about 69 to about 78 wt. % solids, most preferably about 72 to about 78 wt. % solids.

Typically the specified first flowrate and the specified second flowrate are each about 0.5-4 gpm, preferably 1-2 gpm, more preferably 2 gal/min.

Typically the viscosity of the plaster compound is between 2,500 and 28,000 cps, preferably between 4,000-5,600 cps.

Typically the viscosity of the activator compound is between 2,500 and 28,000 cps, preferably between 4,000-5,600 cps.

Typically the viscosity of the setting type joint compound is between 2,500 and 28,000 cps, preferably between 4,000-5,600 cps, preferably wherein the viscosity of the activator compound and the viscosity of the plaster compound are equal.

Typically each of the specified first pressure and the specified second pressure is in a range from a minimum above 0 to a maximum of 3500 psi, for example 1000 psi, preferably in a range from 1500-3000 psi or in a range from 2000-3000 psi, more preferably about 2500 psi, and the specified first pressure and the specified second pressure are equal.

The method optionally sprays the setting type compound on a dry wall, concrete, brick and mortar, textured substrates and other conventional substrates, wherein the spraying is optionally through a nozzle on a spray gun.

Optionally the setting type joint compound consists essentially of the plaster compound and the activator compound.

Optionally the setting type joint compound consists of the plaster compound and the activator compound.

Typically the plaster compound comprises in weight percent on a dry basis:
(a) plaster at about 20-99 wt. % of the plaster compound,
(b) attapulgite clay at about 0-2 wt. % of the plaster compound,
(c) thickening agent at about 0-2 wt. % of the plaster compound,
(d) retarder at about 0-2 wt. % of the plaster compound,
(e) chelator at about 0.05-5 wt. % of the plaster compound, wherein the chelator is selected from tetra sodium pyrophosphate or tetra potassium pyrophosphate,
(f) an optional second chelator at about 0.05-5 wt. % of the plaster compound,
(g) preservative at about 0-2 wt. % of the plaster compound, and
(h) water at about 5-75 wt. % of the plaster compound on a wet basis.

Typically the activator compound comprises in weight percent on a dry basis:
(a) calcium carbonate at about 0-99 wt. % of the activator compound,
(b) attapulgite clay at about 0-2 wt. % of the activator compound,
(c) zinc sulfate monohydrate at about 0.1-99 wt. % of the activator compound,
(d) thickening agent at about 0-2 wt. % of the activator compound,
(e) preservative at about 0-2 wt. % of the activator compound, and
(f) water at about 5-75 wt. % of the activator compound on a wet basis.

Other advantages, benefits and aspects of the invention are discussed below, are illustrated in the accompanying figures, and will be understood by those of skill in the art from the more detailed disclosure below.

As used in the present specification at the very least, and not as an attempt to limit the application of the doctrine of equivalents to the scope of the claim, each numerical parameter modified by the term "about" should at least be construed in light of the number of reported significant digits and by applying ordinary rounding techniques.

BRIEF DESCRIPTION OF THE FIGURES

The patent or application file contains at least one drawing executed in color. Copies of this patent or patent application publication with color drawing(s) will be provided by the Office upon request and payment of the necessary fee.

DETAILED DESCRIPTION OF THE INVENTION

Figure 1:
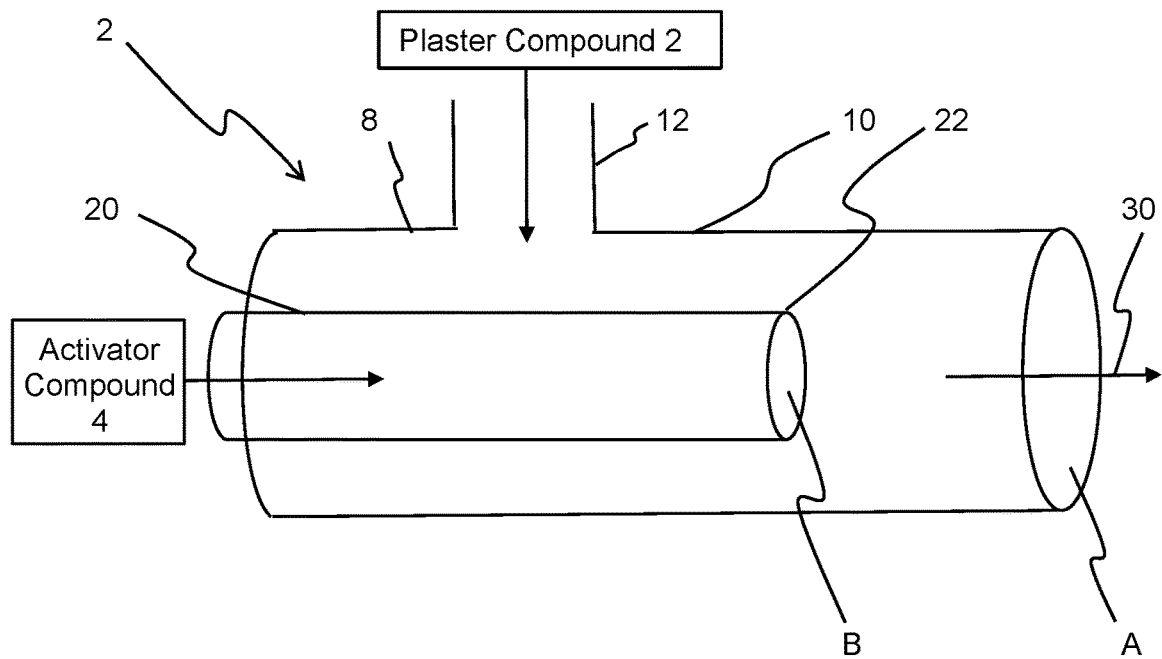
FIG. 1 shows the flow chart for the manifold for combining the activator compound and the plaster compound.

This invention relates generally to a method of making a setting type joint compound. The activator compound and the plaster compound combine to form this setting type joint compound. The activator compound is inserted into the plaster compound via an activator compound tube which is coaxial and within the plaster compound tube. In certain embodiments, one or more of the following conditions occur: (1) The activator compound and the plaster compound are both flowing in the same direction, (2) the activator compound and the plaster compound have the same flow rate, (3) the activator compound and the plaster compound have the same viscosity, (4) the activator compound and the plaster compound have the same pressure, and (5) the activator compound and the plaster compound have the same weight percent solids.

The problem of backflow of one compound is highly unlikely because both the activator compound and the plaster compound are flowing in the same direction.

The activator compound tube discharges from an exit at a downstream portion of the activator tube located within and coaxial with the plaster compound tube to contact the plaster compound; wherein an annulus between the plaster compound tube and activator compound tube at the exit has a first transverse cross sectional area, wherein the activator compound tube at the exit defines an inner second transverse cross sectional area, wherein the first cross sectional transverse area is equal to or greater than the second cross-sectional transverse area. The ratio of the second cross sectional traverse area to the first cross-sectional transverse area is 0.25:1 to 1:1. The activator compound reacts with the plaster compound, yielding the setting type joint compound.

Optionally, after the activator compound is discharged into the plaster compound, the compounds flow into a static mixer. In an embodiment, the length of tube from a T connector to the beginning of the static mixer is set and the discharge point of the activator compound is at about at least 50%, more preferably about 80% of the length.

In an embodiment, the plaster compound flows through a Y connector from the top left. The activator compound flows through the top right of the Y connector, and discharges into the plaster compound after the Y connector at a point distant from the Y connector, allowing the plaster compound to turn and fully develop a consistent flow after the Y connector before the activator compound is discharged.

The pressure of the activator compound and the plaster compound are the same. Flowrate equals pressure divided by area. The flowrates of the activator compound and the plaster compound are the same. This aids in keeping the mix volume ratio of the activator compound:the plaster compound at 1:1.

In one embodiment, the pressures of the activator compound and the plaster compound are over 1000 psi (preferably 1500-3000 or 2000-3000 psi).

In one embodiment, the same pump is used to pump both the activator compound and the plaster compound.

In one embodiment, the plaster compound tube is connected to a T connector at the bottom of the T, and the activator compound tube is connected to the T connector at the top left of the T. In this embodiment, the plaster compound flows through the tube to the T connector and turns. The activator compound tube discharges the activator compound after the T connector at a point distant from the T connector, allowing the plaster compound to turn and fully develop a consistent flow after the T connector before the activator compound is discharged into the plaster compound. This helps minimize pulsation issues.

This joint compound can flow through a sprayer but still has enough structure so that it does not flow off the wall.

A method of making a setting type compound comprising: pumping a plaster compound at a specified first pressure and a specified first flowrate through a first tube, injecting an activator compound at a specified second pressure and specified second flowrate through a second tube, the activator compound discharging from an exit at a downstream portion of the second tube located within and coaxial with the first tube to contact the plaster compound; wherein an annulus between the first tube and second tube at the exit has a first transverse cross-sectional area, wherein the second tube at the exit defines an inner second transverse cross sectional area, wherein the first cross-sectional area is equal to or greater than the second cross-sectional area, and mixing the plaster compound with the activator compound in about a 1:1 to 10:1 volume ratio in a static mixer to yield the setting type joint compound.

For purposes of this disclosure, viscosity is that measured with a Brookfield R/S Plus Rheometer at 75 rpm KU-1030 Spindle.

Vicat set is measured by Vicat set method of 300 g Vicat plunger 1 mm needle (ASTM C472).

Solids mean the ingredients which are solid in the joint compound for example: calcium sulfate hemihydrate, attapulgite clay, thickening agent, retarder, chelating agent, optional second chelating agent, preservative, filler, binder, calcium carbonate, and zinc sulfate monohydrate.

In an embodiment with similar viscosities of the activator compound and the plaster compound, the joint compound's spray viscosity is ultimately un-changed once activated, allowing for faster drying and sag resistance once sprayed. In addition, the activator compound can be pumped at any ratio 1:1 to 10:1, without affecting the viscosity of the product. This offers benefits to choose a custom set time. Pumps currently available on the market are often 1:1 ratios for 2-part systems.

The invented joint compound can accelerate the finishing process versus conventional methods since the joint compound is spray applied at a thick layer and either smooth or sanded. The setting type functionality of the product promotes a hard durable surface that chemically sets within a specified time and can be either recoated or sanded earlier than with a ready-mixed drying type joint compound which cures as it dries (greater than 8-hours depending on thickness).

Plaster Compound

As disclosed above, the present invention relates to a setting type joint compound comprising a blend of plaster compound and an activator compound. The resulting joint compounds have high solids and are sprayable without sagging on walls or prolonged drying times. High solids means 55-88 wt. %, preferably 66-78 wt. %, more preferably 69-78 wt. %, most preferably 72-78 wt. %.

The plaster compound is a mixture of the plaster compound ingredients and plaster compound water. Table 1 provides examples of a dry powder of plaster compound ingredients of the present invention. Any range for a component in a column in Table 1 can be used with other components provided in ranges from other columns in Table 1. For example, the Retarder Preferred Range may be substituted for the Retarder Usable Range to be used with other components provided in their respective usable ranges. Before use to make plaster compound, the plaster compound water can be added to the dry powder (also known as dry components or joint compound components other than water) at a weight ratio of the plaster compound ingredients to the plaster compound water in a range of 9:1-3:2, preferably about 5:1-3:2, more preferably about 3:1-3:2, and most preferably about 3:1. In the present disclosure a dry basis is a water free basis. In contrast, a wet basis is a water inclusive basis.

TABLE 1 plaster compound ingredient formulations (wt. % on dry basis)

| Plaster Compound Ingredients (wt. % on a dry basis) | Component | | | |
|---|---|---|---|---|
| | Useable range | Preferred range | Most Preferred Range | Specific example |
| Calcium Sulfate Hemihydrate | 20 to 99 | 50 to 99 | 75-99 | 75-99 |
| Thickening Agent | 0-4 | 0.05-2 | 0.1-1 | 0.1-1 |
| Retarder | 0-2 | 0-1 | 0-0.05 | 0-0.5 |
| Chelating agent | 0.05-5 | 0.05-2 | 0.25-2 | 0.25-2 |
| Preservative | 0-2 | 0-1 | 0.05-0.3 | 0.05-0.3 |

TABLE 1-continued plaster compound ingredient formulations (wt. % on dry basis)

| Plaster Compound Ingredients (wt. % on a dry basis) | Component | | | |
|---|---|---|---|---|
| | Useable range | Preferred range | Most Preferred Range | Specific example |
| Optional second chelating agent | 0-5 | 0.05-2 | 0.05-1 | 0.05-1 |
| Optional filler | 0-80 | 0-50 | 0-25 | 0-25 |
| Optional binder | 0-5 | 0-5 | 0-5 | 0-5 |
| Plaster Compound Ingredients:Plaster Compound Water (weight ratio) | 9:1-3:2 | 5:1-3:2 | 3:1-3:2 | 3:1 |

The activator compound of the present invention is a mixture of the activator compound ingredients and activator compound water. Table 2 provides examples of a dry powder of the activator compound ingredients. Any range for a component in a column in Table 2 can be used with other components provided in ranges from other columns in Table 2. For example, the Retarder Preferred Range may be substituted for the Retarder Usable Range to be used with other components provided in their respective usable ranges. Before use, to make the activator compound the activator compound water can be added to the activator compound dry powder (also known as dry components or activator compound components other than water) at a weight ratio of the activator compound ingredients to the activator compound water in a range of a range of 9:1-3:2, preferably about 5:1-3:2, more preferably about 3:1-3:2, and most preferably about 2:1.

TABLE 2

Activator Compound formulations (wt. % on dry basis)

| Activator compound Ingredients (wt. % on a dry basis) | Component | | | |
|---|---|---|---|---|
| | Useable range | Preferred range | Most Preferred Range | Specific example |
| Dolomitic Calcium Carbonate | 0-99 | 25-99 | 50-99 | 50-99 |
| Thickening Agents | 0-4 | 0.05-2 | 0.1-1 | 0.1-1 |
| Set accelerator (for example) Zinc Sulfate Monohydrate | 5-99 | 5-75 | 5-50 | 5-50 |
| Preservative | 0-2 | 0-1 | 0.05-0.3 | 0.05-0.3 |
| Activator compound Ingredients:Activator compound Water (weight ratio) | 9:1-3:2 | 5:1-3:2 | 3:1-3:2 | 2:1 |

Typically, a plaster compound formulation comprises or consists essentially of the components in Table 1. Alternatively, the plaster compound formulation can consist of the components in Table 1.

Typically, an activator compound comprises or consists essentially of the components in Table 2. Alternatively, the activator compound can consist of the components in Table 2.

Calcium Sulfate Hemihydrate

Setting-type joint compounds include calcium sulfate hemihydrate. There are two principal forms used, the alpha and beta crystalline forms. In general, the alpha form is the more expensive of the two and produces a stronger product. The beta form is adequate for many uses and, being less expensive, is more commonly used. For joint compounds of the invention, the alpha type of the hemihydrate is used in a blocky cubic crystal microstructure. 20 wt. % or less, more preferably 10 wt. % or less of the calcium sulfate hemihydrate may be alpha type in rod-like crystal microstructure and/or beta type in the present invention.

Typically plaster or Plaster of Paris used as a source of calcium sulfate hemihydrate in the invention is at least 80, at least 90, or at least 95 wt. % calcium sulfate hemihydrate.

For setting-type joint compounds, the calcium sulfate hemihydrate can be included at about 20 wt. % to about 99 wt. % on a dry basis of the joint compound, preferably about 50 wt. % to about 99 wt. % on a dry basis, more preferably about 75 wt. % to about 99 wt. % on a dry basis.

Inert Fillers

Examples of inert fillers for plaster compounds of the invention include, but are not limited to, calcium carbonate (or limestone), dolomitic calcium carbonate, calcium sulfate dihydrate, talc, glass micro bubbles, mica, perlite, pyrophyllite, silica, calcium sulfate anhydrite, diatomaceous earth, clay (e.g., attapulgite, sepiolite and kaolin), resin microspheres, and mixtures thereof.

Perlite or expanded perlite is a lightweight filler that may be used where the joint compound is preferably lightweight. Use of expanded perlite in a lightweight joint compound is taught in U.S. Pat. No. 4,454,267, which is herein incorporated by reference. Expanded perlite is a very lightweight material that contains many cracks and fissures. It can be treated according to the teachings of U.S. Pat. No. 4,525,388, which is hereby incorporated by reference, so that the material does not increase in weight due to water absorbed by capillary action. The treated, expanded perlite, when used, is preferably present in concentrations of at least 5 wt. % on a dry basis of the plaster compound.

Any plaster compound of the present invention optionally includes resin microspheres as a filler to be used in place of or in addition to expanded perlite in lightweight formulations. Preferred shell resins suitable for use in the present invention are homopolymers, copolymers, or blends of homopolymers and/or copolymers formed one or more of acrylonitrile ("ACN"), vinylidene chloride ("VDC"), or methyl methacrylate ("MMA") monomers. Particularly preferred resins are polyacrylonitrile ("PACN"), polyvinylidene chloride ("PVDC"), copolymers formed from ACN and VDC, and copolymers found from ACN, VDC, and MMA. The microspheres demonstrate high resiliency to compression without collapse (non-friable) and are able to withstand the exerted shear stress (shear-stability) of a typical joint treatment manufacturing process and subsequent customer preparation.

Binders

Any binder that is suitable for use in a joint compound is appropriate for use in the present invention. The binder can enhance the adhesion of the joint compound to its substrate, typically drywall. Preferred binders are soft and pliable rather than being extremely hard. Hard binders are likely to create more fine dust particles compared to pliable polymers.

Examples of binders include, but are not limited to, polyvinyl acetate, polyvinyl alcohol, ethylene vinyl acetate co-polymer, vinyl chlorides, vinyl acrylic co-polymer, styrene acrylics, styrene butadiene, polyacrylamide, polyvinyl acrylic, latex emulsions, natural and synthetic starch, casein, and mixtures thereof.

For example, latex emulsion binders are often used in joint compounds (drying-type and/or setting-type) and may be included in plaster compounds of the invention. Examples include polyvinyl acetate and ethylene vinyl acetate emulsions. The amount used may range from about 1.5 wt. % to about 7 wt. % on a dry basis of the plaster compound, preferably about 2 wt. % to about 5.5 wt. % on a dry basis.

The weight ratio of total fillers to total binders is preferably in the range of from about 15:1 to about 5:1.

Thickening Agents

Thickening agents are added to the plaster compound of the present invention. After water is added to the composition, the thickener becomes hydrated and swells, thereby thickening the joint compound. Thickeners are useful, for example, in helping to create the body and flow properties commonly associated with joint compounds, including preventing sag on the wall and in-can settling. Preferably, the thickener is selected so that it substantially hydrates during the mixing process after water is added to the composition, with little or no hydration of the thickener occurring after mixing is completed, to prevent formation of lumps in the joint compound.

Examples of thickening agents include, but are not limited to, ethylhydroxy ethylcellulose, hydroxypropyl methylcellulose, methylhydroxypropyl cellulose, hydroxyethyl cellulose, cellulose-based gums (e.g., xanthan gum, gum Arabic, alginate, pectin, and guar gums), acrylic thickeners (such as alkali soluble emulsion "ASE", hydrophobically modified alkali soluble emulsion "HASE"), clay thickeners (such as attapulgite clay, bentonite) and mixtures thereof.

For sprayable setting-type joint compounds, thickening agents, when included, can be at 0 wt. % to about 4 wt. % on a dry basis of the plaster compound, preferably about 0.05 wt. % to about 2 wt. % on a dry basis, and most preferably about 0.1 wt. % to about 1 wt. % on a dry basis.

For activator compounds, thickening agents, when included, can be at 0 wt. % to about 4 wt. % on a dry basis of the activator compound, preferably about 0.05 wt. % to about 2 wt. % on a dry basis, and most preferably about 0.1 wt. % to about 1 wt. % on a dry basis.

Retarders

Retarders may be included in the joint compounds. Retarders (or set inhibitors or set preventer) slow the setting and/or drying of the joint compounds to provide ample time to properly apply the joint compound.

Examples of retarders include, but are not limited to, polymer compositions including acrylic acid and acrylamide monomer units (e.g., a copolymer (or a mixture of copolymers) of acrylic acid and acrylamide or a blend of a homopolymer of acrylic acid and a homopolymer of acrylamide), as described in U.S. Pat. No. 5,779,786, incorporated herein by reference.

Additional examples of non-calcium bearing phosphate retarders include, but are not limited to, zinc hexametaphosphate, potassium tripolyphosphate, tetra sodium pyrophosphate, sodium tripolyphosphate, monoammonium phosphate, and monobasic potassium phosphate, as described in U.S. Pat. No. 5,746,822, incorporated herein by reference.

Examples of retarders include, but are not limited to, polymer compositions including polyacrylic acid and/or a salt of polyacrylic acid, as described in U.S. Pat. No. 6,805,741, incorporated herein by reference.

For sprayable setting-type joint compounds, retarders can be included at about 0 wt. % to about 2 wt. % on a dry basis of the plaster compound, preferably about 0 wt. % to about 1 wt. % on a dry basis, more preferably about 0 wt. % to about 0.5 wt. % on a dry basis.

Set Accelerators

Set accelerators are included in the activator compound.

Set accelerators (or set initiators or activators) accelerate and/or initiate setting and/or drying of the joint compounds.

Examples of set initiators include, but are not limited to, metallic salts that provide acidic cations, such as zinc sulfate, aluminum sulfate, potassium sulfate, calcium sulfate, ferric sulfate, ferric chloride, and mixtures thereof, as described in U.S. Pat. No. 5,779,786, incorporated herein by reference, preferably aluminum sulfate and/or zinc sulfate, most preferably zinc sulfate or zinc sulfate monohydrate. Another example of set initiators include, but are not limited to, zinc sulfate optionally in combination with iron oxide (e.g., in a weight ratio of 19:1).

Set accelerators are included in the activator compound about 5 wt. % to about 99 wt. % on a dry basis of the activator compound, preferably about 5 wt. % to about 75 wt. % on a dry basis, more preferably about 5 wt. % to about 50 wt. % on a dry basis.

Other Additives

Other additives optionally included in joint compounds include, but are not limited to, preservatives, fungicides, bactericides, defoaming agents, dedusting agents, glycols, humectants, waxes, rosins, shellacs, pitches, fatty acids, tall oils, polyethylene glycols, methoxy polyethylene glycols, polyethylene oxides, methoxy polyethylene oxides, petroleum oil, petroleum residues, paraffins, cellulosic fibers, celluloses, mineral wool, perlites, hydraulic cements, starches, total gypsum (calcium sulfate dihydrate), calcium sulfate anhydrite, surfactants, anionic surfactants, cationic surfactants, zwitterionic surfactants, nonionic surfactants, galactomannan, polygalactomannan, hydrophobically modified galactomannan, hydrophobically modified polygalactomannan, and mixtures thereof. These other additives may be present or absent from the joint compound, the plaster compound or the activator compound. Other additives may comprise 0-10% of the joint compound, plaster compound and/or the activator compound. For setting-type joint compounds, when included, other additives (in total) can be included at about 0.01 wt. % to about 10 wt. % on a dry basis of the plaster compound, preferably about 0.01 wt. % to about 5 wt. % on a dry basis, and most preferably about 0.1 wt. % to about 1.0 wt. % on a dry basis.

Defoamers reduce or hinder the formation of air bubbles, which may form especially when mixing. Examples of defoamers include, but are not limited to, hydrocarbon-based, silicon-based defoamer, and mixtures thereof.

Dedusting agents reduce dust formed when between coats of joint compound, and before the wall is decorated, the joint compound is sanded to even the surface.

A glycol can be used in a joint compound to provide functional properties to the joint compound such as wet edge, open time, controlling drying time, and freeze/thaw stability. Examples of glycols include, but are not limited to, diethyl glycol, ethylene glycol, propylene glycol, and mixtures thereof. When included, the amount of glycol used in a joint compound of the invention is preferably in a range of about 0.1 wt. % to about 1 wt. % on a dry basis of the plaster compound.

Manifold System for Combining the Activator Compound and the Plaster Compound

FIG. 1 shows a manifold system 2 with an inverted T connector 8 for mixing the plaster compound 2 and activator compound 4. The plaster compound 2 is introduced at the top 12 of the inverted T connector and is allowed to turn and flow through a plaster compound tube 10 until reaching about uniform flow. The activator compound 4 flows in the activator compound tube 20 and is discharged at a discharge point 22 into the plaster compound 2 after the plaster flow reaches about uniform flow. A cross sectional transverse area B (of the inner area of the activator compound tube 20) is equal to or smaller than the cross sectional transverse area A (of the inner area of the plaster compound tube 10) minus area B. The ratio of (area B):(area A-area B) is from 0.25:1 to 1:1. After the discharge point 22 of the activator compound 4, the combined stream 30 of plaster compound 2 and activator compound 4 may be mixed in a static mixer 40 (FIG. 2) to form the setting type joint compound 50 and then sprayed, pumped, foamed or otherwise applied to the drywall, concrete, gypsum or other substrate.

Pumps, for example spray guns, may be used to disperse the setting type joint compound. Pumps currently available on the market are often 1:1 ratios for a 2-part system. In the prior art, the 1:1 ratio would reduce the consistency of the product so much it would not be able to hold up on the wall. However, the present invention may be pumped at any volume ratio 1:1 to 10:1 (plaster compound:activator compound) without affecting the viscosity of the product. An example of a spray gun that may be employed is the Graco SPACKMAX or Mark V.

Figure 2:
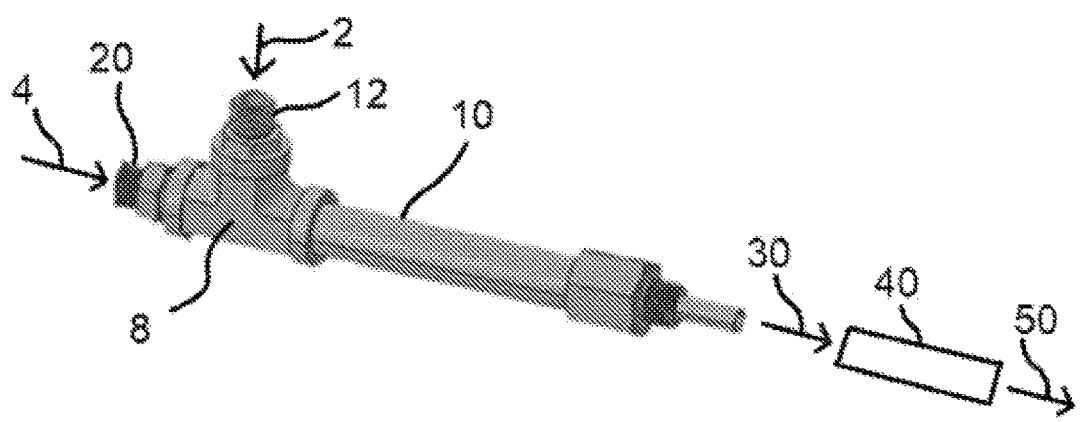
FIG. 2 shows the outer view of the manifold for combining the activator compound and the plaster compound.

FIG. 2 is a 3 dimensional rendering of the manifold of the system 2 described in FIG. 1. Part A of the composition is the plaster compound 2 and fed through the plaster compound tube 10. Part B of the composition is the activator compound 4 and fed through the activator compound tube 20. The activator compound tube 20 is shown as longer than the plaster compound tube 10 for visual purposes only so that the coaxial nature of the tubes is clear. As mentioned above, the combined plaster compound 2 and the activator compound 4 discharge as the stream 30 that may be mixed in the static mixer 40 to form the setting type joint compound 50 and then sprayed, pumped, foamed or otherwise applied to the drywall, concrete, gypsum or other substrate.

Examples

Figure 3:
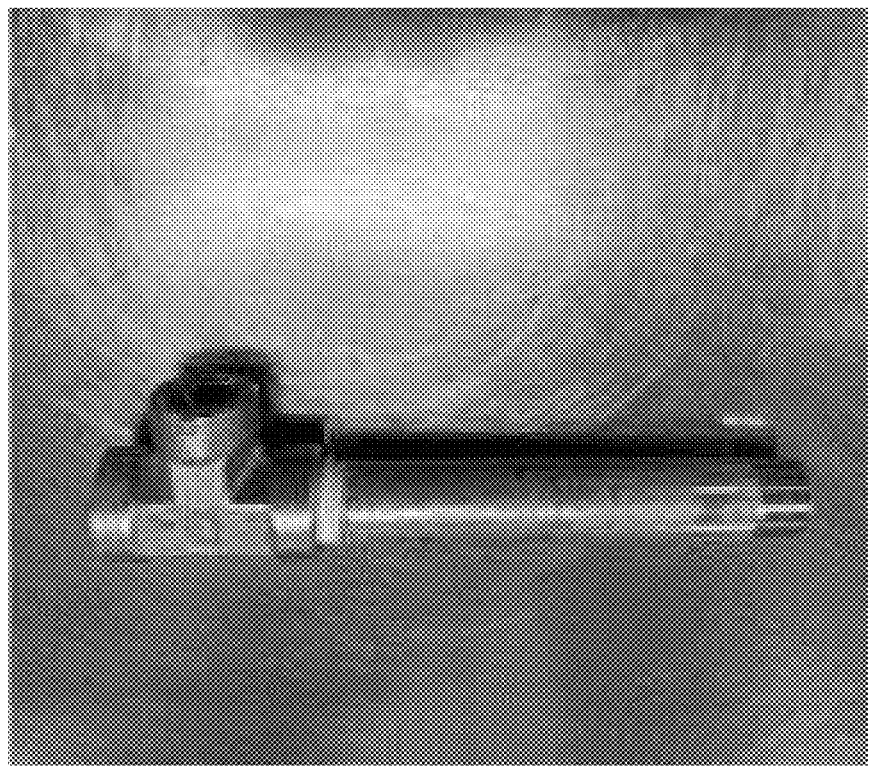
FIG. 3 is a photograph of the manifold for combining the activator compound and the plaster compound.

FIG. 3 is a photograph of the manifold for combining the activator compound and the plaster compound used in the inventive examples. This was the manifold used in tests to prove uniform mixing.

Figure 4:
FIG. 4 is a photograph showing the interior of the manifold for combining the activator compound and the plaster compound.

FIG. 4 is a photograph showing the interior of the manifold for combining the activator compound and the plaster compound used in the inventive examples.

Figure 5:
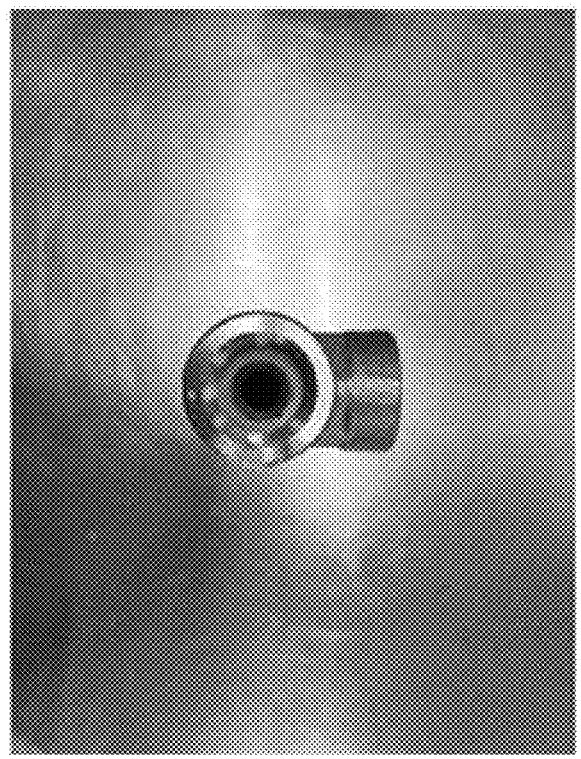
FIG. 5 shows the interior of the activator compound tube before injecting into the plaster compound tube.

FIG. 5 shows the interior of the activator compound tube used in the inventive examples before injecting into the plaster compound tube.

Figure 6:
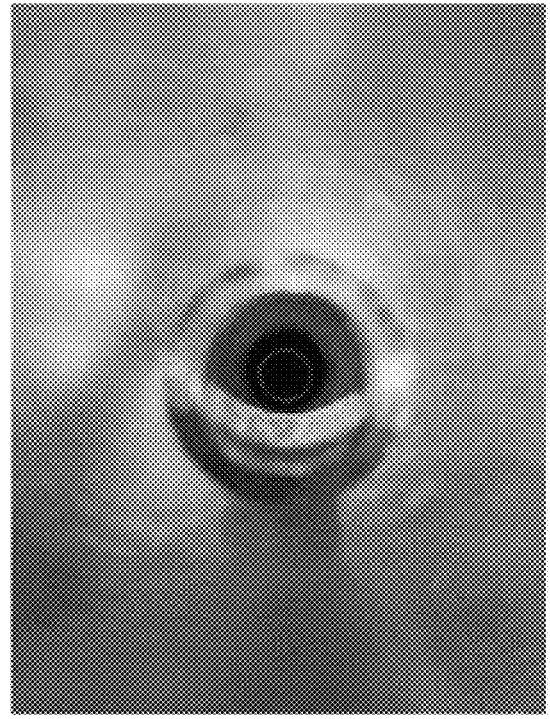
FIG. 6 shows the interior of the plaster compound tube with the coaxial activator compound tube within the plaster compound tube at the exit point of the two components prior to the static mixer.

FIG. 6 shows the interior of the plaster compound tube with the coaxial activator compound tube within the plaster compound tube at the injection point used in the inventive examples.

Figure 7:
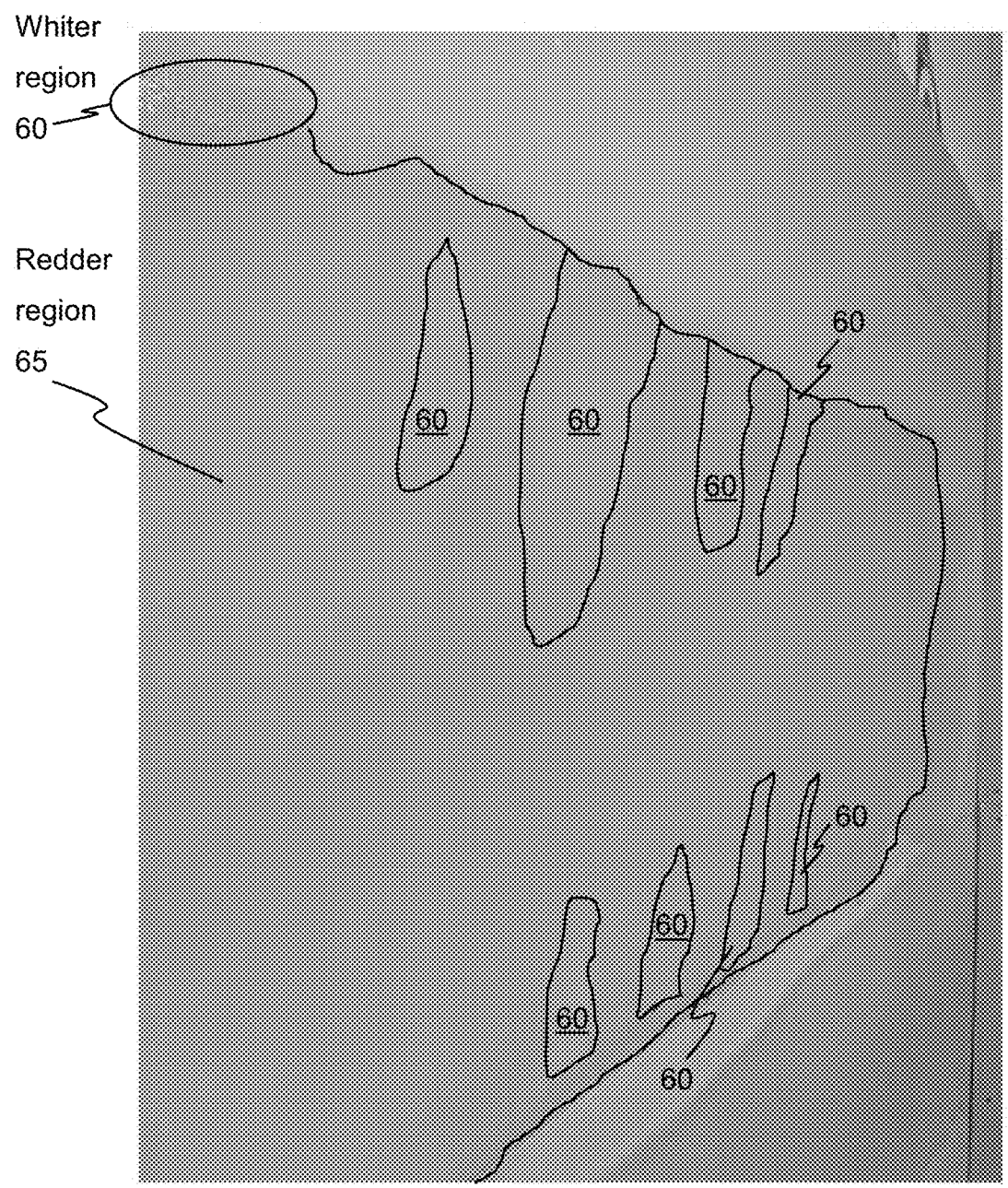
FIG. 7 is a photograph showing prior art sprayed joint compound that has not been properly mixed. The red and white are each one part of the setting type joint compound.
Figure 8:
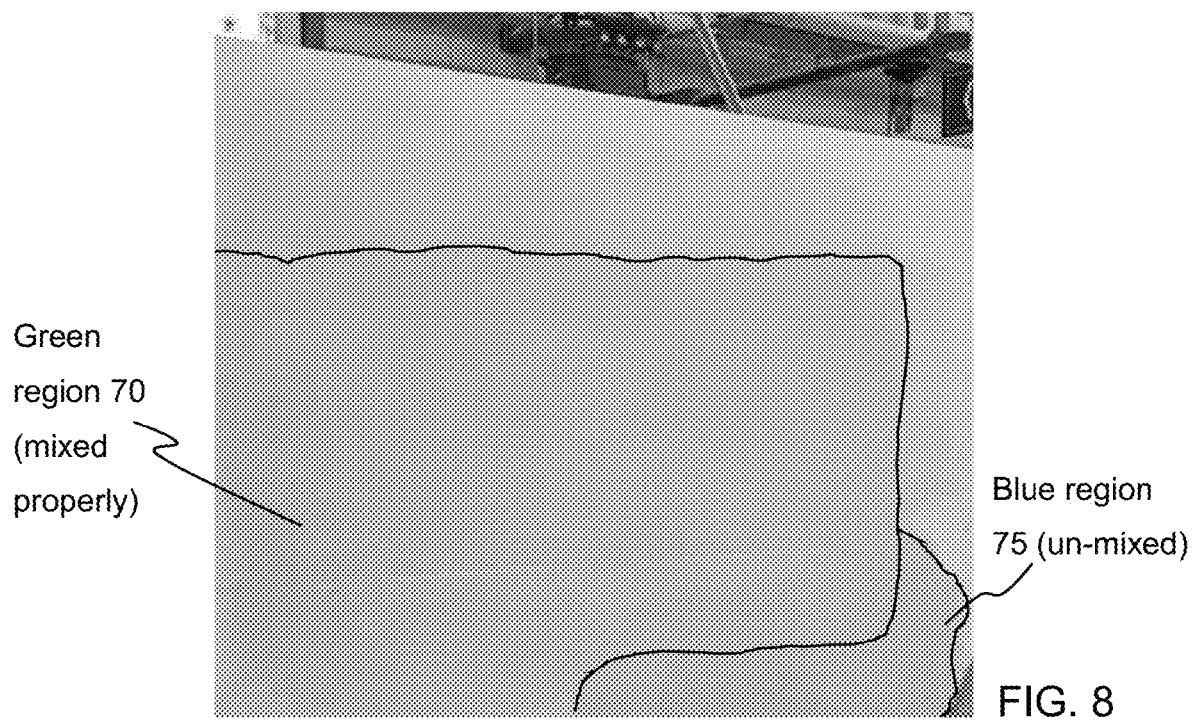
FIG. 8 is a photograph showing the invented sprayed joint compound. The green color shows the mixed plaster compound (blue) and the activator compound (yellow) are mixed to yield green. The blue shown in the background was from the priming of the plaster compound, which was sprayed before the setting type joint compound was sprayed.

The tests conducted and shown in FIGS. 7 and 8 were conducted using two Mark V sprayers from Graco, which has a maximum pumping rate of 1.35 gal/min per sprayer. FIG. 7 is a photograph of a comparative example showing prior art sprayed joint compound that has not been properly mixed. The photograph is annotated to highlight regions of different color. The red color and white color are each the color of one part of the setting type joint compound. The trial that resulted in FIG. 7 was a trial conducted without using the proposed manifold. It got pulsating surges of plaster and activator compounds that were not mixed homogenously. Thus, the color distribution is uneven. In FIG. 7 the relatively whiter regions are labeled 60 and the relatively redder regions are labeled 65.

FIG. 8 is a photograph showing the invented sprayed joint compound. The trial that resulted in FIG. 8 was a trial conducted using the proposed manifold. The photograph is annotated to highlight regions of different color. The plaster compound (that had a blue color) and the activator compound (that had a yellow color) were mixed and sprayed to yield a green color shown in Green region 70. The green color indicates a properly mixed joint compound. Blue region 75 shows the un-mixed plaster compound that had the blue color.

The joint compounds described herein can be applied by spraying onto a surface (e.g., a gypsum board) and allowed to dry and/or set. The dried/set joint compound can then be dry sanded, or wet sanded or sponged. Alternatively, because the joint compounds described herein have improved smoothness when dried/set, the joint compounds can be wet sanded after drying and/or setting.

Dry sanding is generally done by rubbing with dry sandpaper, optionally with a vacuum attachment (e.g., using a drywall vacuum sander). Wet sandpaper is done for example by rubbing with wet sandpaper. Sponging is rubbing the applied joint compound with a sponge wetted with water to be damp. One or more of these can be performed with a vacuum attachment (e.g., using a drywall vacuum sander) to collect any dust formed. Alternatively or additionally, one or more of these methods can be performed in a negative pressure enclosure (e.g., a plastic enclosure with a fan to create negative pressure in the enclosure).

In the present specification any percentage not specified is weight percent unless apparently otherwise. In the present specification, a dry basis is a water free basis and a wet basis is a water inclusive basis.

Clauses Describing Various Characteristics of the Invention

The following clauses describe various characteristics of the present invention.

Clause 1. A method of making a setting type compound comprising:
  pumping a plaster compound at a specified first pressure and a specified first flowrate through a first tube,
  injecting an activator compound at a specified second pressure and specified second flowrate through a second tube, the activator compound discharging from an exit at a downstream portion of the second tube located within and coaxial with the first tube to contact the plaster compound;
  wherein an annulus between the first tube and second tube at the exit has a first transverse cross-sectional area,
  wherein the second tube at the exit defines an inner second transverse cross sectional area,
  wherein the first cross-sectional area is equal to or greater than the second cross-sectional area, and
  mixing the plaster compound with the activator compound in about a 1:1 to 10:1 volume ratio in a static mixer to yield the setting type joint compound.

Clause 2. The method according to clause 1, further comprising spraying the setting type joint compound on a drywall, concrete, brick and mortar, textured substrates and other conventional substrates.

Clause 3. The method according to clause 1 or 2, wherein the plaster compound comprises in weight percent on a dry basis:
  plaster at about 20-about 99 wt. % of the plaster compound,
  attapulgite clay at 0-about 2 wt. % of the plaster compound,
  thickening agent at 0-about 2 wt. % of the plaster compound,
  retarder at 0-about 2 wt. % of the plaster compound, chelator at about 0.05-about 5 wt. % of the plaster compound, wherein the chelator is selected from tetra sodium pyrophosphate or tetra potassium pyrophosphate, an optional second chelator at about 0.05-about 5 wt. % of the plaster compound, preservative at 0-about 2 wt. % of the plaster compound, and water at about 5-about 75 wt. % of the plaster compound on a wet basis.

Clause 4. The method according to any of clauses 1 to 3, wherein the activator compound comprises in weight percent on a dry basis:

calcium carbonate at 0-about 99 wt. % of the activator compound, attapulgite clay at 0-about 2 wt. % of the activator compound, zinc sulfate monohydrate at about 0.1-about 99 wt. % of the activator compound, thickening agent at 0-about 2 wt. % of the activator compound, preservative at 0-about 2 wt. % of the activator compound, and water at about 5-75 wt. % of the activator compound on a wet basis.

Clause 5. The method according to any of clauses 1 to 4, wherein the specified first flowrate and the specified second flowrate are each about 0.5-4 gpm, preferably 1-2 gpm, more preferably 2 gpm, wherein the viscosity of the plaster compound is between 2,500 and 28,000 cps, wherein the viscosity of the activator compound is between 2,500 and 28,000 cps, wherein the viscosity of the setting type joint compound is between 2,500 and 28,000 cps, wherein each of the specified first pressure and the specified second pressure is in a range from above 0 to 3500 psi, and the specified first pressure and the specified second pressure are equal.

Clause 6. The method according to any of clauses 1 to 5, wherein each of the specified first pressure and the specified second pressure is 2000-3000 psi, and the specified first pressure and the specified second pressure are equal.

Clause 7. The method according to any of clauses 1 to 6, wherein the viscosity of the activator compound and the viscosity of the plaster compound are equal.

Clause 8. The method according to any of clauses 1 to 7, wherein the setting type compound has about 55 to about 88 wt. % solids.

Clause 9. The method according to any of clauses 1 to 8, wherein the mixing step has a 1:1 volume ratio of the plaster compound to the activator compound.

Clause 10. The method according to any of clauses 1 to 9, wherein the joint compound has about 69 to about 78 wt. % solids.

Clause 11. The method according to any of clauses 1 to 10, wherein the joint compound has about 72 to about 78 wt. % solids.

Clause 12. The method according to any of clauses 1 to 11, wherein the viscosity of the plaster compound is between 4,000-5,600 cps, wherein the viscosity of the activator compound is between 4,000-5,600 cps, and wherein the viscosity of the setting type joint compound is between 4,000-5,600 cps.

Clause 13. The method according to any of clauses 1 to 12, wherein the setting type joint compound consists essentially of the activator compound and the plaster compound.

Clause 14. The method according to any of clauses 1 to 4 or 7 to 13, wherein the specified first pressure is about equal of the specified second pressure.

Clause 15. The method according to any of clauses 1 to 13, wherein the specified first flowrate is equal to the specified second flowrate.

Clause 16. The method according to any of claims 1 to 15, wherein the spraying is through a nozzle on a spray gun.

Clause 17. The method according to any of clauses 1 to 5, wherein each of the specified first pressure and the specified second pressure is 1500-3000 psi, and the specified first pressure and the specified second pressure are equal.

In the examples herein, as mentioned above, percentages of compositions or product formulae are in weight percentages, unless otherwise expressly stated. The reported measurements also in approximate amounts unless expressly stated, for example, approximate percentages, weights, temperatures, distances or other properties.

In the present specification all percentages, ratios and proportions herein are by weight, unless otherwise specified. In the present specification, a dry basis means a water free basis. In the present specification, a wet basis means a water inclusive basis. Water inclusive basis means water and the other ingredients basis.

While particular versions of the invention have been shown and described, it will be appreciated by those skilled in the art that changes and modifications may be made thereto without departing from the invention in its broader aspects and as set forth in the following claims.

What is claimed is:

1. A method of making a setting type compound comprising:

feeding a plaster compound and injecting an activator compound into a T-connector, wherein the T-connector has a first leg having a first inlet opening in communication with a first tube, the first tube comprising a second leg of the T-connector and a third leg of the T-connector, the second leg and the third leg being aligned, the second leg having a second inlet opening, the third leg having a discharge opening, the second inlet opening and the discharge opening being opposed;

wherein feeding the plaster compound comprises pumping the plaster compound through the first leg into the first tube where the second leg meets the third leg at a specified first pressure and flowing the plaster compound at a specified first flowrate through the third leg of the first tube, injecting an activator compound at a specified second pressure and specified second flowrate through a second tube located within said second leg and extending into the third leg, the activator compound discharging from an exit at a downstream portion of the second tube located within and coaxial with the second leg of the first tube to contact the plaster compound; wherein the exit is upstream of the discharge opening of the first tube;

wherein an annulus between the first tube and second tube at the exit has a first cross-sectional transverse area, wherein the second tube at the exit defines an inner second cross-sectional transverse area, wherein the first cross-sectional transverse area is equal to or greater than the second cross-sectional transverse area, and mixing the plaster compound with the activator compound in about a 1:1 to 10:1 volume ratio in a static mixer downstream of the exit to yield the setting type compound;

wherein a ratio of the inner cross-sectional transverse area of the second tube to cross-sectional transverse area of an annulus between the first tube and the second tube is 0.25:1 to 1:1;

wherein the specified first rate of flow and the specified second rate of flow are each in a range of 0.5-4 gpm, wherein the viscosity of the plaster compound is between 2,500 and 28,000 cps, wherein the viscosity of the activator compound is between 2,500 and 28,000 cps, wherein the viscosity of the activator compound, and the viscosity of the plaster compound and the viscosity of the setting type compound are equal;

wherein the viscosity of the setting type compound is between 2,500 and 28,000 cps, wherein each of the specified first pressure and the specified second pressure is in a range from 1000 to 3500 psi.

2. The method according to claim 1, further comprising spraying the setting type compound on a drywall, concrete, brick and mortar, textured substrates and other conventional substrates.

3. The method according to claim 1,
wherein the plaster compound comprises in weight percent on a dry basis:
plaster at about 20-about 99 wt. % of the plaster compound,
attapulgite clay at 0.05-about 2 wt. % of the plaster compound,
thickening agent at 0-about 2 wt. % of the plaster compound,
retarder at 0-about 2 wt. % of the plaster compound,
chelator at about 0.05-about 5 wt. % of the plaster compound, wherein the chelator is selected from tetra sodium pyrophosphate or tetra potassium pyrophosphate,
an optional second chelator at about 0.05-about 5 wt. % of the plaster compound,
preservative at 0-about 2 wt. % of the plaster compound, and
water at about 5-about 75 wt. % of the plaster compound on a wet basis.

4. The method according to claim 1, wherein the activator compound comprises in weight percent on a dry basis:
calcium carbonate at 0-about 99 wt. % of the activator compound, attapulgite clay at 0-about 2 wt. % of the activator compound,
zinc sulfate monohydrate at about 0.1-about 99 wt. % of the activator compound,
thickening agent at 0-about 2 wt. % of the activator compound,
preservative at 0-about 2 wt. % of the activator compound, and
water at about 5-75 wt. % of the activator compound on a wet basis.

5. The method according to claim 1,
wherein the specified first rate of flow and the specified second rate of flow are each 1-2 gpm,
wherein the viscosity of the plaster compound is between 4000 and 5600 cps,
wherein the viscosity of the activator compound is between 4000 and 5600 cps,
wherein the viscosity of the setting type compound is between 4000 and 5600 cps,
wherein each of the specified first pressure and the specified second pressure is in a range from above 2000 to 3500 psi, and the specified first pressure and the specified second pressure are equal;
wherein the first rate of flow and the second rate of flow are equal.

6. The method according to claim 1, wherein each of the specified first pressure and the specified second pressure is 2000-3000 psi, and the specified first pressure and the specified second pressure are equal.

7. The method according to claim 1, wherein the setting type compound has about 55 to about 88 wt. % solids, wherein the activator compound and the plaster compound have the same weight percent solids.

8. The method according to claim 1, wherein the mixing step has a 1:1 volume ratio of the plaster compound to the activator compound.

9. The method according to claim 1, wherein the setting type compound has about 69 to about 78 wt. % solids.

10. The method according to claim 1, wherein the setting type compound has about 72 to about 78 wt. % solids.

11. The method according to claim 1, wherein the viscosity of the plaster compound is between 4,000-5,600 cps,
wherein the viscosity of the activator compound is between 4,000-5,600 cps, and
wherein the viscosity of the setting type compound is between 4,000-5,600 cps.

12. The method according to claim 1, wherein the setting type compound consists essentially of the activator compound and the plaster compound.

13. The method according to claim 1, wherein the specified first pressure is about equal of the specified second pressure.

14. The method according to claim 1, wherein the specified first flowrate is equal to the specified second flowrate.

15. The method according to claim 1, wherein the spraying is through a nozzle on a spray gun.

16. The method according to claim 1, wherein each of the specified first pressure and the specified second pressure is 1500-3000 psi, and the specified first pressure and the specified second pressure are equal.

17. The method of claim 1, wherein the feeding of the plaster compound and injecting of the activator compound are provided by a single pump.

* * * * *